Figure 1:
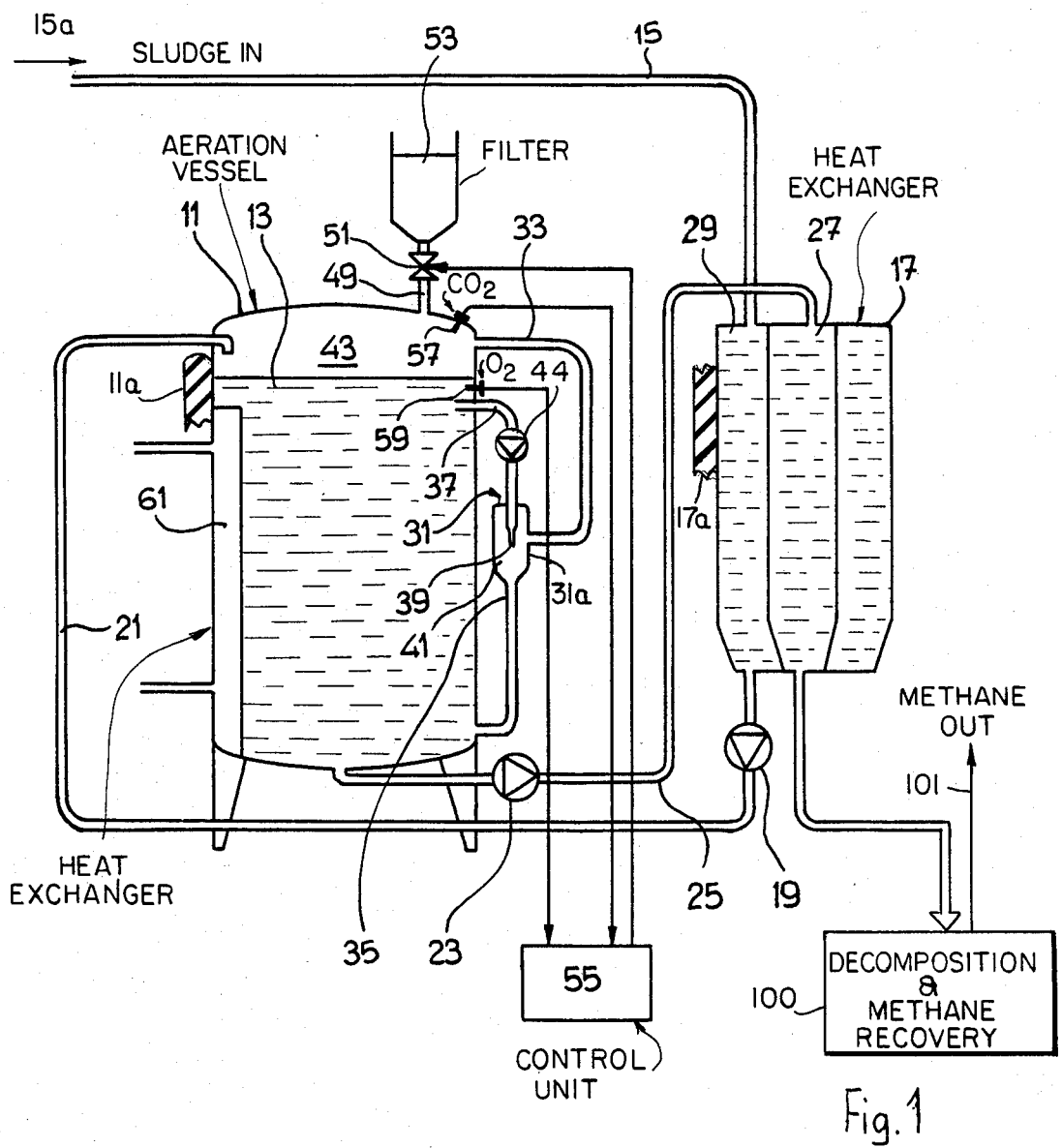

United States Patent [19]

Moilliet

[11] Patent Number: 4,493,770
[45] Date of Patent: Jan. 15, 1985

[54] METHOD AND SYSTEM OF GENERATING HEAT BY BIOLOGICAL DECOMPOSITION OF ORGANIC REFUSE

[75] Inventor: Guy Moilliet, Grabs, Switzerland

[73] Assignee: UTB Umwelttechnik Buchs AG, Buchs, Switzerland

[21] Appl. No.: 444,796

[22] Filed: Nov. 26, 1982

[30] Foreign Application Priority Data

Nov. 28, 1981 [EP] European Pat. Off. ....... 81 109992.8

[51] Int. Cl.³ .................... C02F 11/02; C02F 11/04; C02F 3/30
[52] U.S. Cl. ..................... 210/603; 48/111; 48/197 A; 48/209; 210/180; 210/604; 210/630; 435/167; 435/289; 435/311; 435/316
[58] Field of Search ............. 210/604, 614, 630, 622, 210/180, 220, 96.1, 188, 603; 48/111, 209, 197 A; 435/311–316, 167, 289, 801, 812, 813, 818, 819

[56] References Cited

U.S. PATENT DOCUMENTS

| 3,724,667 | 4/1973 | McKinney | 210/604 |
| 3,981,800 | 9/1976 | Ort | 435/801 |
| 4,062,770 | 12/1977 | Kneer | 210/614 |
| 4,071,443 | 1/1978 | Gorski et al. | 210/604 |
| 4,207,180 | 6/1980 | Chang | 435/314 |
| 4,246,099 | 1/1981 | Gould et al. | 210/630 |

FOREIGN PATENT DOCUMENTS

| 2464297 | 4/1981 | France | 435/167 |
| 2470162 | 6/1981 | France | 435/167 |
| 2481874 | 11/1981 | France | 435/167 |
| 732215 | 5/1980 | U.S.S.R. | 210/604 |

Primary Examiner—S. Leon Bashore
Assistant Examiner—K. M. Hastings
Attorney, Agent, or Firm—Frishauf, Holtz, Goodman & Woodward

[57] ABSTRACT

Heat can be recovered by biological generation of heat upon aeration of refuse, such as garbage or sludge, in an aeration vessel (11) by introducing oxygen-containing gas, such as air, in a closed cycle (11, 33, 31, 35) to thereby enrich gas withdrawn from the vessel with the oxygen, typically by reintroduction of gas withdrawn from an upper gas portion (43) of the vessel, after introduction of additional oxygen, for example controlled by a valve (65) into a lower portion of the contents of the aeration chamber. Control can be effected automatically, by a control unit (55, 55') through a valve (51, 51') or manually; automatic control can be effected, for example, by sensing oxygen or carbon dioxide concentration by suitable sensors (57, 59) within the vessel. To permit recovery of methane of high quality in a subsequent decomposition and methane recovery container, material withdrawn from the aeration vessel is degassed in degassing chambers (68; 69, 70), for example by storage for about ½ hour, and venting of emanating gases. Control of valves regulating flow from, and to, the aerating vessel and the degassing chambers (69, 70) permits preheating of freshly introduced refuse by the material withdrawn from the degassing chambers in a counterflow heat exchanger (17'), while preventing possible escape of non-aerated substances from the vessel (11) by isolating the aeration vessel (11) during introduction of new refuse, and emptying only a chamber (e.g. 69) of said degassing chamber system (68).

11 Claims, 2 Drawing Figures

METHOD AND SYSTEM OF GENERATING HEAT BY BIOLOGICAL DECOMPOSITION OF ORGANIC REFUSE

The present invention relates to a method and a system to obtain heat by biological decomposition of organic substances, and more particularly organic refuse, for example sludge, in which oxygen, for example in the form of air, or as pure oxygen, is introduced to the refuse.

BACKGROUND

Various methods and systems have been proposed to recycle refuse and garbage to obtain useful substances, or energy in the form of heat. Usually, the methods use an apparatus which includes an aeration container having a bottom wall to which an aeration apparatus is connected which introduces fresh air to sludge or biological refuse. Municipal refuse is usually classified as trash, which includes essentially non-biodegradable or solid elements, such as old furniture, household discards, metallic objects and the like; and garbage, which usually includes biologically degradable organic substances. Garbage, sludge, and similar substances are often referred to as "biomass". The present invention is directed to recovering heat from biomass upon decomposition of biological refuse which, hereinafter, collectively will be referred to as garbage.

In the known systems, garbage, which already may be decomposed and form sludge, is introduced into an aeration container into which fresh air is introduced, which may result in heating of the garbage-sludge mixture to a temperature of between 50° to 70° C. To sterilize the sludge and garbarge, a temperature of 60° C. over a time of 30' is usually necessary in order to kill enterobacteria, for example salmonellae. This system has the advantage that the heat, necessary for the treatment of the garbage and the decomposition product thereof, which is usually termed sludge, is generated due to the activity of thermophilic microorganisms. The system, however, has the disadvantage that the operation thereof is close to the temperature range at which salmonella bacteria may still remain in viable state. Utilization of the thus generated biological heat for external purposes, for example for heating of buildings or the like, cannot be considered since removal of heat would decrease the temperature of the decomposing substance, and the decomposition temperature may then drop below that at which toxic bacteria are reliably killed.

The energy balance of introducing fresh air into decomposing garbage or sludge is poor; a portion of the air, or even pure oxygen gas introduced into the garbage or sludge, escapes in the form of warmed gas, together with water vapor. The heat loss, thus, is considerable. Due to these losses, substantial decomposition of organic substances is necessary in order to retain the decomposing material, which turns into sludge, at the desired temperature. As the decomposition of the organic substances proceeds, less material is available for subsequent decomposition, so that in the decomposing vessel, less gas will be available.

It has been proposed to use pure oxygen, rather than air, for aeration, since then higher temperatures will occur. The use of pure oxygen is expensive, particularly since the utilization of oxygen is relatively high. Introducing pure oxygen, therefore, is not economically practical.

THE INVENTION

It is an object to recover heat upon biological decomposition of organic materials, i.e. biomass, and to so arrange the decomposition that relatively high temperatures will result which reliably deactivate salmonella bacteria, parasites such as eggs of worms or the like, and additionally generate sufficient heat to permit withdrawal thereof for external heat utilization, for example for heating a house, while preferably additionally permitting recuperation of combustible gases for possible additional combustion to generate yet more heat.

Briefly, garbage is introduced into an aeration vessel, for example in form of a slurry; an oxygen containing gas, typically ambient air—but it may be pure oxygen—is introduced into the garbage slurry in the vessel to oxidize the garbage or sludge therein. In accordance with a feature of the invention, at least a portion of the gases emanating from the sludge in the aeration vessel is recovered, and this portion is returned in a closed cycle to the vessel, and hence to the slurry of garbage and the sludge formed thereby, together with additional oxygen, for example by adding additional ambient air, introduced into the closed cycle of the returning gas. Thus, the recycled gas is continuously enriched with oxygen.

In accordance with a feature of the invention, the aerated garbarge and sludge mixture is removed from the aeration vessel and degassed in a settling tank or vessel. The degassed sludge is then conducted to a decomposition container for recovery of methane upon further decomposition of the sludge-garbage mixture.

Recycling the gas which is emitted by the garbage-sludge slurry mixture at least in part in a closed cycle, while enriching with oxygen from air, or pure oxygen, minimizes loss of heat. The high losses due to evaporation, thus, are avoided, and the temperature of the garbage-sludge mixture will rise rapidly within the aeration vessel by inherent heating due to the decomposition to a temperature of about 70° C., that is, a temperature which quickly and reliably kills bacteria and other undesirable components within the sludge, for example eggs of worms, insects, and the like, to result in material which can be hygienically handled. The heat, in the recycling process, which is generated is so high that it is possible to cool the vessel and remove heat for external use, while still maintaining a temperature level of, for example, 70° C. Thus, heat which is removed, for example, by a heat exchanger, can be utilized for other purposes, for example to preheat fresh charges of garbage or the like, or to heat a building. For example, the method can also be used to preheat manure, particularly liquid manure. A portion of the heat generated can be used to heat, for example, a farm home, and this portion is usually sufficient for heating of an entire farm building complex. The heat which is externally conducted can be used in a temperature range of from about 85° C. down to about 30° C., without interfering with thermophilic decomposition of the garbage-sludge mixture within the aeration vessel.

In accordance with a feature of the invention, the sludge should be heated to a temperature of about 70° C. as rapidly as possible. Since the entire aeration vessel can readily be insulated, heat losses to ambient surroundings are a minimum since evaporation losses are avoided or a minimum. The temperature is reached rapidly, without decomposition of a substantial mass of organic substance. Thus, organic substances remain within the aeration vessel and in the sludge which is drawn off therefrom in order to generate gases upon subsequent further decomposition, for example to recover methane in a decomposition vessel or tank. The additional decomposition gases, as well known, have high heat content and are suitable for heating as well for use in combustion engines for example.

In accordance with a feature of the invention, the process and system can be further improved so that the resulting gases which can be later obtained upon decomposition have high heat content and are of excellent utilitarian quality. If sludge-garbage mixtures are withdrawn from the aeration vessel for subsequent decomposition, anaerobic processes in the decomposition vessel, tank or basin may interfere with the quality of the gases generated therein due to the high oxygen content of the garbage-sludge mixture derived from the aeration vessel.

In accordance with a feature of the invention, thus, fresh garbage-sludge slurries or the like are introduced into the aeration vessel and aerated therein, that is, by introducing oxygen, for example air. Subsequent to the heating due to biological processes, however, and before being withdrawn for decomposition, the aerated garbage-sludge materials are first degassed, before being permitted to be transported for further decomposition and methane recovery. Degassing is, in accordance with a feature of the invention, carried out in small batches in which, preferably, two alternately connectable tanks or vessels are provided, connected to the aeration vessel, so that one degassing tank or vessel can be emptied, while the other one is being filled, so that the closed process is never interrupted, and feedback between the settling or degassing tanks or vessels and the aeration vessel is prevented.

The method and system has the advantage of recovering a maximum amount of heat arising in biological processes upon aeration of garbage, garbage-sludge, or slurries of garbage with a minimum of equipment, so that the system and apparatus will have an excellent heat balance and high efficiency from an energy point of view, permitting recovery of substantial energy contained in garbage and the like.

DRAWINGS

Figure 2:
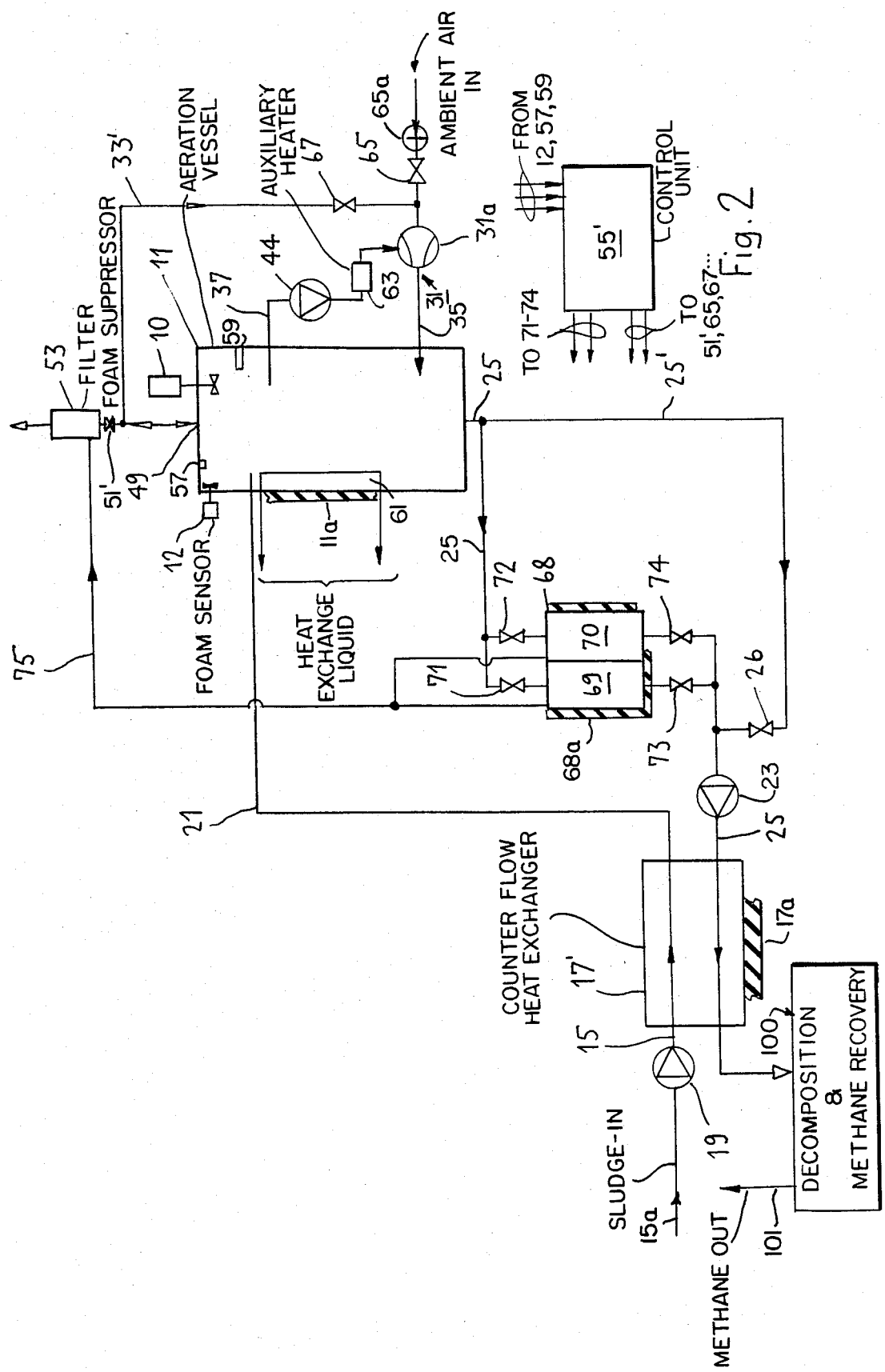

FIG. 1 is a schematic diagram of a system for biological generation of heat; and FIG. 2 is a schematic diagram utilizing the system of FIG. 1, in which the heat obtained is enhanced, and decomposition gases, such as methane, are obtained, which are of even higher quality than those in the simpler system of FIG. 1.

An aeration vessel 11 is provided to receive a biomass, e.g. a slurry of garbage, sludge, and the like. Preferably, the sludge has been comminuted and may be transported in form of a slurry or semi-liquid, in a conduit 15, as schematically indicated by arrow 15a. The conduit 15 conducts the slurry to a heat exchanger 17 in which the incoming slurry is preheated by treated material from the aeration chamber 11. A pump 19 pumps the sludge in the direction of the arrow 15a through the heat exchanger 17. Preferably, the heat exchanger 17 includes an outer, for example cylindrical chamber 29, surrounding an inner chamber 27. The outer chamber 29 receives the incoming slurry. Pump 19 pumps the preheated slurry through line 21 into the aeration vessel 11 to a predetermined fill level. Slurry which has been aerated is removed from the aeration vessel by pump 23 over line 25 and introduced into the central chamber 27 of the heat exchanger 17. The aerated heated slurry within the chamber 27 will heat the freshly introduced cold slurry in the outer chamber 29, so that the slurry is introduced into the vessel 11 already at a temperature at which rapid decomposition by thermophilic bacteria will result. The aeration chamber is filled in batches or charges. A certain remaining quantity is always left within the aeration chamber 11. This remaining quantity will contain a high concentration of thermophilic bacteria, so that a new charge or batch introduced into the vessel 11 will rapidly reach the required temperature.

The thermophilic bacteria require oxygen for their viability. Oxygen is supplied to the aeration chamber 11 by an aeration supply system 31. The aeration supply system 31 is connected with a top pipe 33 to the top portion or dome of the vessel 11 in the gas space 43 above the fill level, and has an outlet pipe 35 which is connected to the bottom of the vessel 11 below the fill level. In the example shown, the aeration system 31 is constructed in form of a water jet system, operated by a pump 44, withdrawing liquid components from the upper portion of the aeration vessel, but below the liquid level thereof, and introducing the liquid in form of a jet stream into an injector 31a which includes a nozzle 39. Liquid material from the vessel 11 is thus introduced from line 37 through the nozzle 39 to be injected into a chamber 41 which is connected via line 33 with the space 43 in the vessel 11. Space 43 in the vessel 11 will be filled with gases. The jet from the nozzle 39 carries along gas within the chamber 41, and withdraws gas therefrom as well known in connection with liquid-gas injectors. The stream from the nozzle 39 thus pulls gas in the chamber 41 therealong, diffused in part within the liquid which is ejected from the nozzle, in part in the form of small air bubbles, or the like. Pump 44, which provides pressure, introduces the material from the pipe 35 in the lower portion of the aeration vessel 11.

The aeration vessel 11 is entirely closed, except that on the top a stub opening 49 is provided to permit balancing of oxygen concentration between the gas which is being circulated and ambient air. In operation, the gas in the space 43 will become enriched with carbon dioxide, whereas the oxygen content will decrease. By opening a valve 51 in the stub 49, compensation of oxygen concentration is provided, permitting carbon dioxide to leave the interior of the aeration vessel 11 and air to enter. The valve 51 is connected in the stub 49 between the outlet from vessel 11 and a filter 53. The filter 53, for example, may be a diatomaceous earth filter. Valve 51 is controlled from a control unit 55 which has a carbon dioxide sensor 57 and an oxygen sensor 59 connected thereto. Only one of the sensors is strictly necessary, although both sensors are desirable. The carbon dioxide sensor 57 is located in the space 43 above the fill line of the garbage or sludge slurry in the vessel 11, and will provide an output signal when the carbon dioxide level increases above a predetermined value, providing an output signal. Control unit 55 will then provide a signal to valve 51 which, for example, is electromagnetically operated, to open the valve 51 and provide for rebalancing of the oxygen in the space 43. Alternatively, or additionally thereto, the oxygen sensor 59, positioned within the slurry or sludge in vessel 11 is provided to furnish an output signal if the oxygen content within the slurry or sludge drops below a predetermined level, again causing the control unit to open valve 51. The signals from the sensors 57, 59 can be connected in the control unit through an OR-gate so that the control unit will react whenever a limiting condition of excess carbon dioxide, or shortage of oxygen is detected. Filter 53 also acts as a filter for smelly substances, but permits exchange of oxygen in air within the aeration vessel 11, and carbon dioxide leaving the aeration vessel 11.

Preferably, tank 11 is covered with insulation 11a to maintain the heat generated upon aeration of the garbage and/or sludge therein. The heat exchanger 17, preferably, also is covered with insulation as schematically shown at 17a.

A heat exchanger 61, only schematically shown and, for example, permitting circulation of water in heat exchange relation with respect to the contents of the vessel 11, is secured thereto or therein. Excess heat can thus be derived from the aeration vessel 11, which is generated during the aeration process. This heat may be used, for example, to preheat the sludge, slurry, and the like, introduced through pipe 15; usually, more than sufficient additional heat can be recovered, for example for heating of living spaces and the like.

The thermal insulation, shown schematically at 11a and 17a, preferably is of the high-efficiency type; all other components of the system, such as pipes, pumps, and the like, also, preferably, are covered with insulation.

Aerated slurry of garbage and/or sludge, and the like, pumped by pump 23 through line 25 into heat exchanger 17 is then conducted to a decomposition tank or vessel or basin 100. During further decomposition, gases which are combustible, and thus can provide additional heat, will be generated. Such gases, typically, are methane, which can be taken out by a suitable methane output line 101 from the decomposition station, if the decomposition station is suitably arranged for to methane recovery.

The efficiency of operation of the system, and the purity of recovered methane and other combustible gases, as well as the sterility of sludge or slurry, can be improved by modifying the system of FIG. 1, as shown in FIG. 2, where similar elements have been given the same reference numerals and will not be described again.

As in FIG. 1, the sludge or slurry of garbage is conducted into a heat exchanger, being introduced in accordance with the arrow 15a. Pump 19 is located in advance of the heat exchanger in line 15. The heat exchanger, contrary to the heat exchanger shown in FIG. 1, is a continuous counter flow-type heat exchanger 17'. The outlet of the heat exchanger is connected through line 21 to the aeration vessel 11. The heat exchanger 17 can operate as a continuous flow-type heat exchanger, with essentially continuous flow therethrough, to provide for continuous flow into the aeration vessel 11. The drainage from the aeration vessel 11, through line 25, as will be explained below, is in batches; the batches, however, are of much smaller size than the capacity of the aeration vessel 11, so that the flow of hot, aerated garbage slurry and sludge can also proceed slowly. Of course, the system can operate also in batch processes, in which the quantity of material withdrawn from vessel 11 is replaced by new, non-aerated sludge or garbage, preheated in counterflow heat exchanger 17'. By preheating, the slurry in line 21 is raised to a temperature in which thermophilic bacteria can decompose the organic substances therein in the aeration chamber.

Aeration is effected by the aeration device 31, which introduces gas into the stream of slurry which is removed by pump 44 from the upper portion of the aeration vessel through line 37 and reintroduced, after addition of oxygen-containing gas, into the aeration vessel at the lower portion thereof. An additional, or auxiliary heater 63 is located in the bypass line 37–35 to permit heating the stream of material therein. The auxiliary heater 63, for example, can be an electrical heater, a hot-water heating coil utilizing heat derived from heat exchanger 61, or the like.

The gas which is added to the aeration vessel 11 is derived, in part, from the aeration vessel 11 itself. It is branched from the stub 49 over line 33' to the aeration device 31. A valve 65 is provided which has its inlet 65a open to ambient air—for example through a filter and a check valve 13 in order to permit introduction of ambient air into the recycling bypass stream. Valve 65 can be controlled, automatically, by control unit 55', for example under control of carbon dioxide and oxygen sensors 57, 59—of which sensor 59 is not shown in FIG. 2 for clarity—or valve 65 can be controlled manually by an operator. A further valve 67 permits throttling or interrupting the recycling of gas from the vessel 11 and, for example, then introducing oxygen at inlet 65a, opening valve 65, to introduce, for example, ambient air thereto. Filter 53, connected to line 33, permits gases to leave the aeration vessel 11; filter 53, then, will permit for example carbon dioxide from venting from the tank. The filter is so arranged that smelly components are absorbed thereby.

To prevent foaming, a foam suppressor apparatus 10 is provided which, for example, may be of any standard construction. The foam suppressor need not operate at all times; a sensor 12, sensing formation of foam, is provided, connected to control unit 55' by suitable connection lines—not shown—to cause the control unit to energize the foam suppressor whenever foam is being sensed. Such a foam sensor, for example, may be a small fan driven by a motor; upon the occurrence of foam, the fan blades will be braked, causing an increase in current flow through the motor which is being sensed in the control unit which, then, energizes the foam suppressor 10, for example through a relay.

The gas circulatory system differs from that of the embodiment of FIG. 1 primarily in separating the emission of carbon dioxide from the vessel 11 and the introduction of oxygen, for example oxygen from ambient air. Control of aeration is improved by this separation. The bypass recycling arrangement 31 includes an injector 31a which, for example, again can be an injector pump as described in connection with FIG. 1. It is also possible to introduce ambient air, for example, in the form of compressed air through a compressed-air nozzle, through an atomizing device or the like, for example directly into the line 35 from the auxiliary heater 63.

In accordance with a feature of the invention, the slurry and sludge removed from the aeration vessel 1 is not directly introduced into a decomposition and methane recovery unit 100 but, rather, is first introduced into a degassing system 68. The degassing system 68 includes two chambers 69, 70, the flow to which is controlled by respective valves 71, 72, and the flow from which is controlled by valves 73, 74. The chambers 69, 70 are so dimensioned that they can retain a charge of, for example, about 5% to 10% of the contents of the aeration vessel 11. One charge or batch remains in a respective chamber 69 or 70 for about 30 minutes. This time is sufficient to provide for degassing of the slurry and sludge removed from the vessel 11. Gases emitted during degassing from the chambers 69, 70 can flow over line 75 to the filter 53 for emission to ambient air; a bypass 25' is provided through which, if necessary, the sludge or slurry, after aeration, can be removed from vessel 11 and directly introduced into the heat exchanger 17', bypassing the degassing system 68. Under ordinary operating conditions, valve 26 is closed.

The system 68 is provided to degas the material withdraw from the vessel 11 before the material actually reaches the decomposition and methane recovery unit 100. This prevents intermixing of the methane which results upon decomposition with non-combustible gases which are present in the sludge or slurry and arise during aeration in the aeration vessel. Intermixing of such non-combusted gases with the methane decreases its quality as a combustion source. The system 68 also permits utilization of the heat exchanger 17' in counterflow form. Such a heat exchanger requires simultaneous flow of sludge or slurry in the respective lines 15 and 25. If slurry were removed from the aeration chamber 11 at the bottom thereof while new slurry is introduced in the top, the danger may arise that traces of untreated, new material is removed. This must be avoided in all cases since, otherwise, toxic bacteria and other additives in the slurry could reach the decomposition and methane recovery station 100. Such feedback is prevented by the intermediate interposition of the unit or system 68. System 68 permits, first, drawing sludge and/or slurry from the aeration vessel 11 into one of the chambers, for example chamber 70, and then, about ½ hour later when it is effectively degassed, pumping it by pump 23 through the heat exchanger while, at the same time, new, fresh slurry is pumped by pump 19 into the aeration vessel, and while both valves 71, 72 are closed.

To prevent loss of heat energy, the aeration vessel 11, as well as all other equipment is, preferably, insulated as shown schematically at 11a. The aeration chambers 69, 70 of the system 68, likewise, are also preferably insulated, as shown schematically at 68a.

Various changes and modifications may be made, and features described in connection with FIG. 1 can equally be used with features described in connection with FIG. 2, and vice versa. Other changes, likewise, can be made within the scope of the inventive concept; for example, pure oxygen may be introduced for example at inlet 65a, rather than oxygen from ambient air. In contrast to prior art methods, pure oxygen can be used in the system of FIG. 2 quite economically, since heat losses are small, so that, practically, all oxygen which is introduced is used for biological activity. In dependence on eventual use and installation, various other modifications are possible. For example, the sludge and/or slurry received from the aeration vessel 11 can be pumped into various different types of aeration chambers, and more than two chambers 69, 70 may be used.

The system is shown in its general arrangement; check valves, and other valve arrangements necessary in an actual installation, and which are obvious matters of design, have been eliminated from the drawing for purposes of clarity. Their use is well known in systems of this kind.

If solid, biologically degradable substances are to be handled, the usual and customary comminuting apparatus is preferably provided in advance of the inlet line 15, and water, additionally, is introduced, so that pump 19 can readily handle the substances introduced into pipe 15, for example in form of a slurry.

The opening from outlet filter 53 can be kept small; or, alternatively, valve 51 or the stube 49 may have such a small diameter that it acts as a throttle. Permitting gas to escape at only rate prevents inefficiency in operation, due to loss of heat from the system. Some such heat loss is unavoidable to provide for sufficient venting, for example through a flue stack.

The gas within the space 43 (FIG. 1) is hot and highly humid. Its reintroduction into the aeration vessel at a lower portion thereof through tube or pipe 35 insures continuous circulation and aeration of the garbage or slurry or sludge within the aeration chamber, so that thermophilic bacteria can act efficiently, necessary oxygen for biological heat generation being provided by the air in space 43 and/or such additional oxygen or ambient as is introduced through valve 65. If the introduced material is essentially liquid, pump 23 pumping the material from the aeration chamber may be designed to handle material which has a water content of about 90–95%. This highly liquid material permits constructing the gas recycling system 31 with a water jet injector pump. Use of water jet injector pumps has the advantage that a substantial component of the gas is diffused within the material injected thereby, and the remaining portion of the gas is distributed in the form of tiny air bubbles. Thus, oxygen is efficiently introduced and diffused into the contents of the vessel 11. The diameter of the introduced air bubbles is small, so that the effectiveness of the introduced oxygen or air supply for the bacteria in the aeration chamber is efficiently provided. During generation of biological heat, carbon dioxide is generated, and oxygen is consumed. Thus, carbon dioxide must be removed, and oxygen introduced. The system of FIG. 1, permitting oxygen to be introduced through the filter 53, functions effectively; the system of FIG. 2, however, is preferred, since control of the introduction of oxygen is independent of the venting of carbon dioxide, and thus a closer supervision of the process of aeration and biological decomposition can be maintained. Suitable thermostats or temperatures gauges, providing output signals representative of temperature in the vessel at selected positions may be used, connected, for example, to the respective control units 55, 55' for activated introduction of oxygen in addition to sensing of carbon dioxide level, and to provide supervisory and monitoring indications.

Valve 51' and filter 53 can be constructed as a dual filter-valve combination, with suitable check valves interposed so that, for example, only carbon dioxide can be vented from space 43 through the filter 53, that is, emitted from vessel 11, and oxygen, only, can enter and be introduced into line 33. By periodic respective opening and closing of the respective valves, undesired losses of heat can be further reduced.

The present invention provides generation of more heat than necessary only to treat garbage slurry or sludge and the like by aeration in order to kill toxic or harmful bacteria and other pathogenic contents. In agricultural applications, the material introduced into pipe 15—see arrow 15a—may be manure, e.g. essentially liquid manure; in such applications, generation of heat can be one of the primary reasons for operation of the system.

Storing the sludge/slurry removed from the aeration vessel 11 in the system 68—FIG. 2—has the advantage that gas bubbles therein will have sufficient time to rise to the surface. Effective degassing of the removed charge can thus be obtained, usually within about ½ hour—so that practically no residual gas from the aeration vessel will reach the decomposition and methane recovery unit 100. The decomposition and methane recovery unit or stage can be of any well-known and suitable standard type. Removing gas from the aeration vessel has the advantage that the recovered methane will be of excellent purity and quality. The gases which will be removed at the degassing or settling stage 68 usually have a foul smell. A filter 53—which can be separately connected to line 75, if desired, and which suppresses undesirable smells should, therefore, preferably be used.

Use of two or more chambers 69, 70 in the system 68 has the advantage that the chambers can be alternately filled and emptied. Thus, in operation, simultaneously with pumping a new charge into the aeration vessel 11, already treated sludge or slurry can be drawn from one of the chambers, 69 or 70, by suitable operation of the valves 73, 74—venting being provided through line 75. This permits operating the heat exchanger in advance of the aeration vessel as a counterflow heat exchanger, which results in cost savings in initial construction and is a very efficient operation.

An auxiliary heater 63 is desirable, although not strictly necessary. The auxiliary heater 63 permits rapid starting of biological activity within the aeration vessel 11, even if the material introduced thereinto through pipe 21 is of low temperature. Heater 63 can be electrically operated or, for example, utilize heat from the heat exchanger 61, which, for example, uses a suitable heat exchange liquid such as water; and/or also have heat exchange with filter 53 so that all residual heat within the system is recovered, and the energy efficiency of the overall system enhanced.

I claim:

1. Method of generating heat and biologically decomposing organic refuse, to obtain a sludge or slurry free from toxic or pathogenic contents, in which the refuse is introduced into an aeration vessel (11), including the steps of introducing a gas containing oxygen into the refuse in the aeration vessel to oxidize the refuse and retain the refuse in the vessel, the refuse, upon oxidation, generating heat and heating the refuse;

removing the then hot aerated refuse, in form of an aqueous suspension or slurry from the vessel (11);

conducting the thus removed still hot refuse to a holding vessel (68; 69, 70) having at least two chambers (69, 70);

storing the aqueous suspension or slurry in the holding vessel for a period of time sufficient to degas the suspension or slurry and to reliably kill all toxic bacteria or harmful contents;

then conducting the degassed refuse in the aqueous suspension or slurry to a decomposition and methane recovery container (100) for further decomposing the contents of the degassed aqueous suspension or slurry and for recovering methane therefrom, and wherein said conducting and storing steps comprise selectively sequentially conducting the still hot refuse to respective separate ones of the chambers, alternately, and storing the aqueous suspension in the chambers, and then, alternately, conducting the degassed refuse from the respective chambers to the decomposition and methane recovery container, to permit alternate filling of the respective chambers, while isolating at least one of the chambers from the aeration vessel (11) and subsequent selective withdrawal of the degassed contents thereof.

2. Method according to claim 1, wherein said step of removing aerated refuse comprises removing a minor portion of the contents of the aeration vessel (11) therefrom;

separating and segregating the removed portion form the contents of the aeration vessel (11);

then carrying out said storing step;

and then conducting the separated portion through a heat exchanger (17') to recover heat retained in the degassed, separated portion.

3. Method according to claim 2, including the step of introducing additional refuse, particularly garbage and sludge, in an aqueous suspension or slurry, into said aeration vessel during the time the stored portion of the refuse removed from the aeration vessel, and separated from the aeration vessel, is conducted through the heat exchanger (17').

4. Biological heat generating and refuse treatment apparatus, to recover heat upon decomposition of organic refuse, particularly garbage, sludge, and the like, in an aqueous suspension or slurry, and to obtain detoxified and harmless material, comprising an aeration vessel (11) having means (31; 65) for introducing oxygen to the refuse;

controlled inlet means (15, 19) connected for introduction of said refuse into the aeration vessel (11), the organic refuse, upon introduction into the vessel, being heated by biological decomposition;

outlet means (25) connected to said aeration vessel, located remotely from the inlet means for removing said organic refuse which became hot upon biological decomposition in the vessel (11);

a degassing chamber means (68; 69, 70) connected to said outlet means (25) of said aeration vessel (11) for storing a portion of the still hot biologically decomposed contents of the aeration vessel, withdrawn therefrom, for a time sufficient to provide for degassing thereof; and a decomposition and methane recovery container (100) connected to said degassing chamber means (68; 69, 70) downstream thereof, for further decomposing the contents from said degassing chamber means and for recovering methane therefrom;

wherein the degassing chamber means comprises at least two chambers (69, 70);

and valves (71, 72, 73, 74) selectively connecting one of said chambers (69 or 70) in the outlet (25) between the aeration vessel (11) and the decomposition and methane recovery container, for alternate filling of the respective chambers, while isolating at least one of the chambers from the aeration vessel (11), and subsequent selective withdrawal of the degassed contents thereof.

5. Apparatus according to claim 4, further including a counterflow heat exchanger (17') having a "cold" path connected between the controlled inlet means (15, 19) of said aeration vessel (11);

and further having a "hot" path connected between the outlets from said chambers (69, 70) and the decomposition
container (100) for preheating of the aqueous suspension or slurry being introduced into the aeration vessel (11) with heat contained in the portion of the decomposed aerated refuse withdrawn from the degassing chamber means (68; 69, 70).

6. Apparatus according to claim 4, wherein said aeration vessel (11) is thermally insulated (11a) to maintain the temperature within said aeration vessel at a level sufficient to kill bacteria and harmful substances within the refuse.

7. Apparatus according to claim 6, wherein the degassing chamber means (68; 69, 70) is thermally insulated (68a) to maintain the hot biologically decomposed refuse withdrawn from the aeration vessel (11) at essentailly withdrawal temperature to insure killing of toxic or harmful bacteria or pathogenic contents thereof.

8. Apparatus according to claim 5, wherein aeration vessel (11) is thermally insulated (11a) to maintain the temperature within said aeration vessel at a level sufficient to kill bacteria and harmful substances within the refuse.

9. Apparatus according to claim 8, wherein the degassing chamber means (68; 69, 70) is thermally insulated (68a) to maintain the hot biologically decomposed refuse withdrawn from the aeration vessel (11) at essentially withdrawal temperature to insure killing of toxic or harmful bacteria or pathogenic contents thereof.

10. System according to claim 4, further including a control unit (55') selectively isolating said chambers (69, 70) from the aeration chamber (11) by control of a valve means (71, 72) forming part of said valves (71-74) connected between the aeration vessel (11) and said chambers upon flow of refuse through said inlet means (15,19) into the aeration vessel (11) to prevent escape of non-aerated substance form the vessel into the decomposition and methane recovery container.

11. System according to claim 8, further including a control unit (55') selectively isolating said chambers (69, 70) from the aeration chamber (11) by control of a valve means (71, 72) forming part of said valves (71-74) connected between the aeration vessel (11) and said chambers upon flow of refuse through said inlet means (15, 19) into the aeration vessel (11) to prevent escape of non-aerated substance from the vessel into the decomposition and methane recovery container.

* * * * *